United States Patent
Zhang et al.

(10) Patent No.: US 11,964,349 B2
(45) Date of Patent: Apr. 23, 2024

(54) AUTOMATIC PRESS-FIT CONTROL SYSTEM AND METHOD FOR SHAFT-HOLE FITTING PARTS

(71) Applicant: BEIHANG UNIVERSITY, Beijing (CN)

(72) Inventors: Wuxiang Zhang, Beijing (CN); Baowen Zhang, Beijing (CN); Xilun Ding, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 17/968,880

(22) Filed: Oct. 19, 2022

(65) Prior Publication Data
US 2023/0042786 A1    Feb. 9, 2023

Related U.S. Application Data

(63) Continuation of application No. PCT/CN2021/075710, filed on Feb. 7, 2021.

(30) Foreign Application Priority Data

Apr. 23, 2020 (CN) .......................... 202010328265.X

(51) Int. Cl.
*B23P 19/02* (2006.01)
(52) U.S. Cl.
CPC .................................... *B23P 19/02* (2013.01)
(58) Field of Classification Search
CPC ....................................................... B23P 19/02
See application file for complete search history.

(56) References Cited

U.S. PATENT DOCUMENTS 10,420,265 B2    9/2019   Zhang et al.

FOREIGN PATENT DOCUMENTS

CN    205651028 U    10/2016
CN    107861490 A    3/2018
(Continued)

OTHER PUBLICATIONS

Translation of CN-112453895-A (Year: 2021).*
International Search Report of PCT/CN2021/075710, dated May 17, 2021.

*Primary Examiner* — Jacob J Cigna
(74) *Attorney, Agent, or Firm* — Locke Lord LLP; Tim Tingkang Xia, Esq.

(57) ABSTRACT

The present invention relates to a system and its control method for press-fit equipment for shaft-hole fit parts. The automatic press-fit control system mainly includes a control center, a loading and unloading control subsystem, a visual inspection subsystem, and a press-fit control subsystem, and each subsystem communicates with the control center through a communication interface. The control center automates the operation of each subsystem independently, such as the product loading and unloading process, the visual inspection process, and the press-fit process through the control center. The advantages of the invention are: it can realize automatic loading, inspection, and press-fit of the product, which greatly improves the level of production automation and production efficiency; the control system adopts modular design, and each subsystem can operate independently under the control of the control center; it adopts visual inspection and automatic compensation of angle deviation, with good fault tolerance.

5 Claims, 7 Drawing Sheets

(56) References Cited

FOREIGN PATENT DOCUMENTS

| CN | 108367402 | A | | 8/2018 | |
|----|-----------|---|---|--------|---|
| CN | 209256250 | U | | 8/2019 | |
| CN | 111571176 | A | | 8/2020 | |
| CN | 112453895 | A | * | 3/2021 | ............ B23P 21/004 |

* cited by examiner

AUTOMATIC PRESS-FIT CONTROL SYSTEM AND METHOD FOR SHAFT-HOLE FITTING PARTS

CROSS-REFERENCE TO RELATED PATENT APPLICATION

This application is a continuation application of International Patent Application No. PCT/CN2021/075710, filed on Feb. 7, 2021, which itself claims priority to Chinese Patent Application No. CN202010328265.X filed in China on Apr. 23, 2020. The disclosures of the above applications are incorporated herein in their entireties by reference.

FIELD

The present invention belongs to the field of automated assembly, and specifically relates to an automatic press-fit control system for shaft-hole fitting parts and its control method, which can be used for automated press-fit assembly tasks of shaft-hole-fit parts in industrial assembly lines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Assembly is an important component of modern equipment manufacturing production, in the total production process assembly has the characteristics of time-consuming and high cost. With the popularization of three-dimensional modeling, CNC machining centers and other technologies, the level of automated manufacturing of parts has been greatly improved. However, due to the complexity of the assembly task, it has long relied on workers to carry out purely manual or semi-automatic operations, lowering the production efficiency and the quality consistency. Therefore, the assembly process has become a constraint that affects the production efficiency of the equipment manufacturing industry and the improvement of production automation.

SUMMARY

With respect to the above-mentioned shaft-hole fitting type assembly task, the present invention proposes an automatic press-fit control system and method for shaft-hole fitting parts, which can be used for automatic control of press-fit operation for shaft-hole fitting type assembly task. The proposed automatic press-fit control system adopts modular design and mainly includes a control center, a loading and unloading control subsystem, a visual inspection subsystem and a press-fit control subsystem.

The automatic press-fit control system for shaft-hole fitting parts in the present invention includes a plurality of subsystem and a control center. The subsystems include a loading and unloading control subsystem, a visual inspection subsystem, and a press-fit control subsystem.

The loading and unloading control subsystem is used to control a material conveyor, to detect material pallet in place, and to control the material pallet lifting and an industrial robot. The visual inspection subsystem is used to control the rotation of a turntable, and to obtain a hole deviation size and a hole deviation angle of a perimeter hole of each of the parts. The press-fit control subsystem is used to control a stamping motor, to record a rotation number of the stamping motor to obtain a moving distance of a stamping head, and to detect a pressure change on the stamping head during a press-fit assembly process of the parts. Each of the subsystems has respective communication ports to communicate with the control center therethrough. The control center is used to interact with a factory MES system for operational tasks, to control operation of the subsystems, and to upload fault alarm information to the factory MES system.

The automatic press-fit control method for the shaft-hole fitting parts includes:

step 1: sending, by the factory IVIES system, job assignments to the control center, and subsequently sending, by the control center, loading signals to the loading and unloading control subsystem;

step 2: performing, by the loading and unloading control subsystem, a loading task, wherein the loading and unloading control subsystem sends a loading completion signal to the control center after the loading task is completed;

step 3: sending, by the control center, a detection signal to the visual inspection subsystem after the control center receives the loading completion signal from the loading and unloading control subsystem;

step 4: starting, by the visual inspection subsystem, an inspection process to realize visual inspection after receiving the detection signal, wherein if the visual inspection does not pass, the visual inspection subsystem sends alarm information to the control center, and the control center uploads the alarm information to the factory MES system and waits for manual intervention; and if the visual inspection passes, the visual inspection subsystem sends a visual inspection pass signal to the control center, and the control center sends a press-fit signal to the press-fit control subsystem;

step 5: performing, by the press-fit control subsystem, a press-fit task to realize automatic press-fit assembly of a workpiece after receiving the press-fit signal, wherein the press-fit subsystem sends a press-fit completion signal to the control center after the automatic press-fit assembly is completed, and wherein if a fault occurs during the press-fit task, the press-fit control subsystem sends a press-fit alarm signal to the control center, and the control center uploads the press-fit alarm signal to the factory MES system and wait for manual intervention;

step 6: sending, by the control center, an unloading signal to the loading and unloading control subsystem after receiving the press-fit completion signal, wherein the loading and unloading control subsystem performs the unloading task in response to the unloading signal to realize automatic unloading; and step 7: sending, by the loading and unloading control subsystem, an unloading completion signal to the control center after completion of the unloading task, thus completing the press-fit assembly of a product.

In the step 2, the loading task includes:

step a: controlling, by the loading and unloading control subsystem, a rotary motor driver to drive a rotary motor of the material conveyor, and thus driving the material conveyor belt, wherein the material pallet moves with the material conveyor, and a loading side proximity switch detects whether the material pallet reaches a specified position;

step b: when the material pallet is detected by the loading side proximity switch, stopping, by the rotary motor driver, driving the rotary motor, and turning on a solenoid valve controlling a pallet lifting cylinder to control the pallet lifting cylinder to lift the material pallet;

step c: sending, by the control center, motion commands to the industrial robot to control the industrial robot to move to be above the material pallet, then to control end air claws of the industrial robot to close to pick up the workpiece, and to control an air claw magnetic sensor to detect whether the picking is successful;

step d: after detecting that the workpiece is successfully picked up, disconnecting the solenoid valve controlling the pallet lifting cylinder, wherein the pallet lifting cylinder falls down at this time;

step e: sending the motion commands to the industrial robot to control the industrial robot to move to a press loading position, and at the same time to control the industrial robot to release end air jaws to place the workpiece on the turntable, and detecting whether the air jaws are released by the air jaw magnetic sensor.

step f: After the air jaws are released, the motion command is given to the industrial robot to control the movement of the industrial robot away from the press loading position to the waiting position.

step g: turning on a solenoid valve controlling a three-jaw chuck to control the three-jaw chuck to close to clamp the workpiece; and step h: sending, by the loading and unloading control subsystem, a loading-completion signal to the control center to complete the loading task.

In the step 4, the inspection process includes:

step A: controlling an industrial camera to take photographs of the workpiece, and controlling an image processing system to process and analyze images of the photographs, to extract the positions of axial holes from the images through edge detection, and to compare the extracted positions and shapes of the axial holes with positions and shapes of calibrated circular holes in order to determine whether the positions of the axial holes are deviated, wherein step B is executed if the positions are deviated, and step D is executed if a hole deviation angle is within an adjustment range;

step B: sending, by the visual inspection subsystem, a detect-pass signal to the control center, thus completing the inspection process;

step C: sending, by the visual inspection system, the hole deviation angle to a turntable motor driver, wherein the turntable motor driver is driven to rotate by one compensating deviation angle, and repeating the step A; and step D: calculating, by the image processing system, the hole deviation angle, and sending, by the visual inspection system, a detect-fail signal to the control center if the hole deviation angle exceeds a preset upper limit of deviation compensation, thus completing the inspection process.

In the step 5, the press-fit task includes:

step 1): controlling the stamping motor to rotate, and detecting, by a pressure sensor in real time, whether a pressure reaches a threshold value, wherein step 2) is executed if the pressure does not reach the threshold value and the stamping motor does not reach a preset number of turns, and step 4) is executed if the pressure does not reach the threshold value and the stamping motor reaches the preset number of turns;

step 2): controlling the stamping motor to remain rotating, wherein the step 4) is executed if the pressure reaches the threshold value;

step 3): controlling the stamping motor to stop and rotate reversely to zero position, and sending, by the press-fit control subsystem, a completion signal to the control center to complete the press-fit task; and step 4): stopping the stamping motor immediately and detecting whether the stamping motor reaches the preset number of turns, wherein if the stamping motor reaches the preset number of turns, the stamping motor rotates reversely to the zero position and the press-fit control subsystem sends a completion signal to the control center to complete the press-fit task, and if the stamping motor does not reach the preset number of turns, the press-fit control subsystem sends an alarm signal to the control center to complete the press-fit task.

In the step 6, the unloading task includes:

step ①: turning on a solenoid valve controlling a three-jaw chuck to control the three-jaw chuck to open to release the workpiece;

step ②: sending a motion command to the industrial robot to control the industrial robot to move to a press loading position, and to control end air claws of the industrial robot to close to pick up the workpiece;

step ③: detecting, by an air claw magnetic sensor, whether a product is picked up successfully, wherein after the product is picked up successfully, the solenoid valve controlling a pallet lifting cylinder is turned on to lift up the material pallet;

step ④: sending, by a robot control cabinet, movement commands to the industrial robot to control the industrial robot to move to be above of the material pallet, and to control the end air jaws of the industrial robot to release to place the material;

step ⑤: detecting, by the air claw magnetic sensor, whether the end air jaws are open, wherein after the end air jaws are open, the solenoid valve controlling the pallet lifting cylinder is disconnected and the pallet lifting cylinder falls;

step ⑥: controlling a rotary motor to drive the material conveyor, and detecting, by an unloading proximity switch, whether the material pallet reaches an outlet;

step ⑦: stopping the rotary motor when the material pallet is detected by the unloading proximity switch; and step ⑧: sending, by the loading and unloading control subsystem, a completion signal to the control center to complete the unloading task.

The advantages of the present invention can be concluded as follows:

(1) The invention can be widely applied to control whole process of automatic press-fit assembly of shaft-hole fitting parts, with high automation level, which greatly improves the assembly efficiency.

(2) The automatic press-fit control system of the present invention adopts a modular design, dividing the control system into several independent control subsystems according to their functions, and each subsystem can operate independently under the control of the control center.

(3) The invention adopts visual inspection methods to detect the position deviation of the axle hole, and utilize the motor driving turntable to compensate the angle deviation, which has a certain degree of fault tolerance. By setting the upper limit of angle deviation, the system automatically stops press-fit assembly process and alarms when the position deviation of the axis hole is too large, ensuring the safety of the system.

BRIEF DESCRIPTION OF THE DRAWINGS

The following accompanying drawings of the present invention are used here as part of the present invention to understand the present invention. Embodiments of the present invention and their descriptions are shown in the accompanying drawings to explain the principles of the present invention. In the accompanying drawings.

DETAILED DESCRIPTION

In order to make the objectives, technical solutions, and advantages of the present invention clearer, the present invention is further described in detail below with reference to the accompanying drawings and embodiments. It should be understood that the specific embodiments described herein are only used to explain the present invention and are not used to limit the present invention.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

Figure 1:
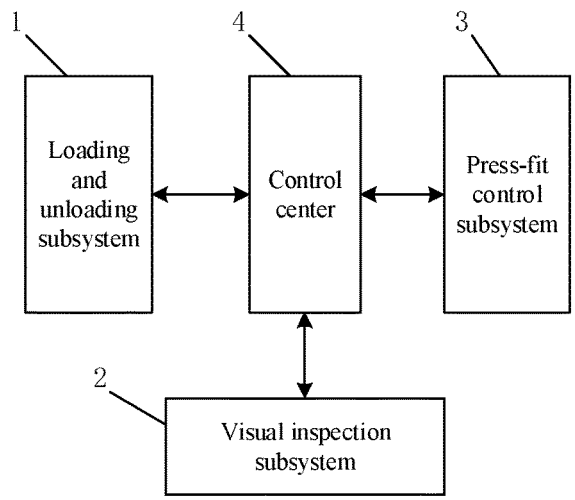
FIG. 1 is the block diagram of the automatic press-fit control system proposed in the present invention.

FIG. 1 is a schematic structural diagram of a simulation system for a digital product according to an embodiment of the present disclosure. It should be stated that the system as shown in FIG. 1 only shows schematic components to perform the functions, and, unless otherwise indicated, the components may be implemented or modified by hardware and/or software components or a combination thereof that provide functions.

The present invention is further demonstrated in detail below in conjunction with the accompanying drawings.

The present invention is an automatic press-fit control system for shaft-hole fitting parts and its control method, wherein the automatic press-fit control system includes four parts: a loading and unloading control subsystem 1, a visual inspection subsystem 2, a press-fit control subsystem 3, and a control center 4, as shown in FIG. 1.

Figure 2:
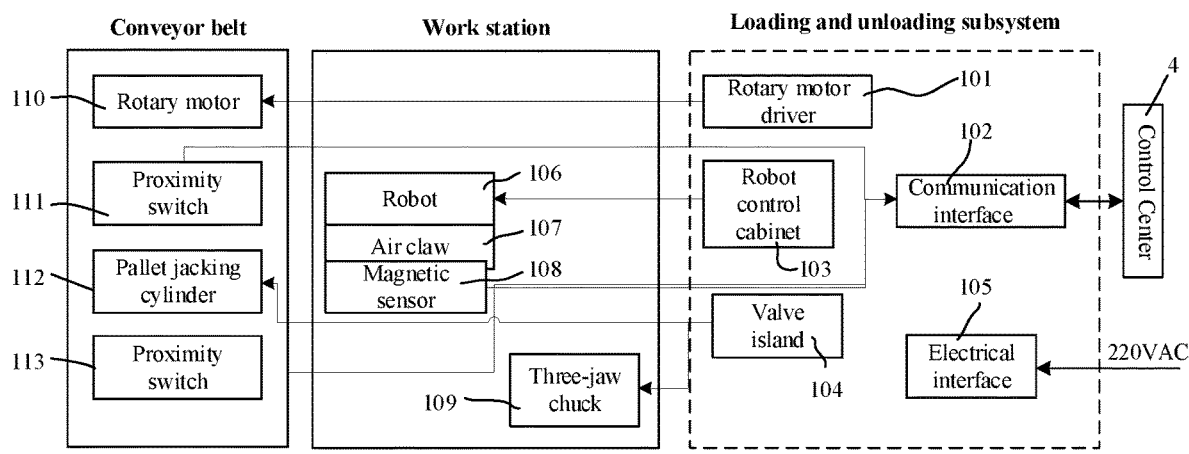
FIG. 2 is the block diagram of the loading and unloading control subsystem in the automatic press-fit control system proposed in the present invention.

As shown in FIG. 2, the loading and unloading control subsystem 1 mainly includes a rotary motor driver 101, a proximity switch on the loading side 111, a proximity switch on the unloading side 113, a valve island 104, a robot control cabinet 103, a communication interface of the loading and unloading control subsystem 102, and an electrical interface of the loading and unloading control subsystem 105.

The rotary motor driver 101 can drive the rotary motor 110 to rotate according to the motion command given by the control center 4, and then drive the material conveyor belt to realize the transportation of the material pallet.

The proximity switch on the loading side 111 is mounted in front of the material pick-up position for detecting whether the material pallet is transferred to the material pick-up position. The proximity switch on the unloading side 113 is mounted at the end of the conveyor belt for detecting whether the material pallet passes the end of the conveyor belt during unloading.

The valve island 104 is a component consisting of a plurality of solenoid valves, which are used to control the pallet jacking cylinder 112, the three-jaw chuck 109, and the air jaw 107 of the industrial robot, thereby controlling the pallet jacking cylinder 112 to jack the material pallet, controlling the opening and closing of the three-jaw chuck 109 and the opening and closing of the air jaw 107 of the industrial robot.

The motion path of the industrial robot 106 is converted into RAPID program instructions by teaching programming and stored in the robot control cabinet 103, which controls the motion of the industrial robot 106 along the taught motion path by retrieving the RAPID program instructions. The I/O control board is installed in the robot control cabinet 103, and its output signal controls the on/off of the solenoid valve corresponding to the air jaw 107 of the industrial robot in the control valve island 104, which in turn controls the air jaw 107 to open and close to realize the picking and placing of parts.

The communication interface 102 connects the loading and unloading control subsystem 1 with the control center 4 to realize their intra-communication. The electrical interface 105 of the loading and unloading control subsystem is connected to the external power supply to realize the power supply of the loading and unloading control subsystem 1.

Figure 3:
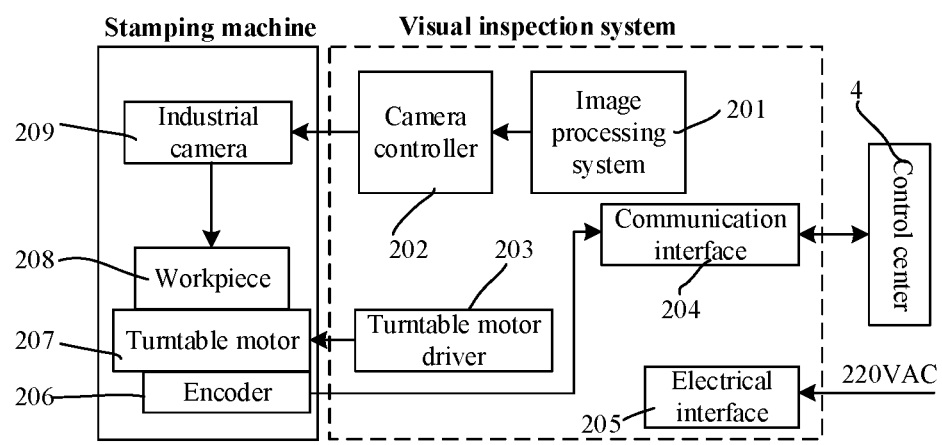
FIG. 3 is the block diagram of the visual inspection subsystem in the automatic press-fit control system proposed in the present invention.

As shown in FIG. 3, the visual inspection control system 2 mainly includes a camera controller 202, an image processing system 201, a turntable motor driver 203, a communication interface 204 of the visual inspection control system, and an electrical interface 205 of the visual inspection control system.

The camera controller 202 is used to supply power to the industrial camera 209, control the industrial camera to take pictures, and save the captured images. The image processing system 201 is used to perform edge detection on the image acquired by the industrial camera 209, identify the axle hole in the image, compare the position and shape of the extracted axial hole with the position and shape of the calibrated hole, thereby obtain the hole deviation size and hole deviation angle.

The turntable motor driver 203 is used to drive the turntable motor 207, which in turn enables the turntable to rotate and drive the parts on the turntable.

The communication interface 204 of the visual inspection control system is connected to the control center to realize the communication between the visual inspection control system 2 and the control center 4; the electrical interface 205 of the visual inspection control system is connected to the external power supply to realize the power supply of the visual inspection control system 2.

Figure 4:
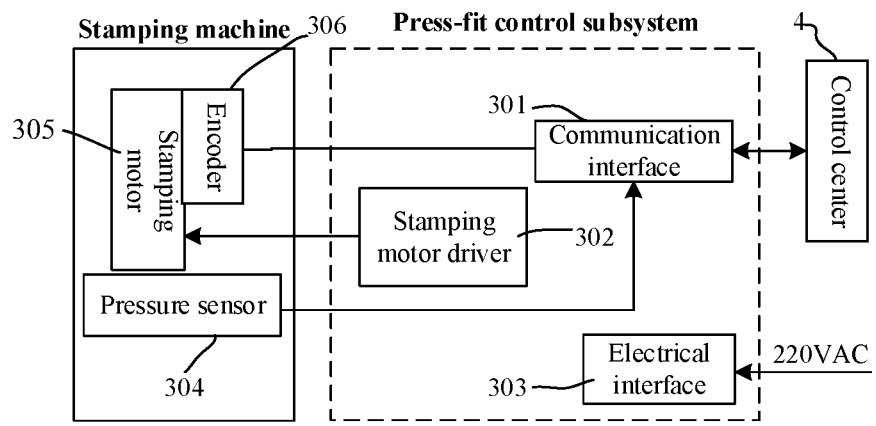
FIG. 4 is the block diagram of the press-fit control subsystem in the automatic press-fit control system proposed in the present invention.

As shown in FIG. 4, the press-fit control subsystem 3 includes a stamping motor driver 302, a stamping motor encoder 306, a pressure sensor 304, a communication interface 301 of the press-fit control subsystem, and an electrical interface 303 of the press-fit control subsystem.

The stamping motor driver 302 is used to drive the stamping motor 305, which in turn drives the stamping head up and down.

The stamping motor encoder 306 is used to record the number of revolutions of the stamping motor 305 and thus obtain the distance of the stamping head movement.

The pressure sensor 304 is used to detect changes in the pressure applied to the stamping head during the press-fit process.

The communication interface 301 of the press-fit control subsystem is connected to the control center 4 to realize the communication between the visual inspection control system 3 and the control center 4; the electrical interface 303 of the press-fit control subsystem is connected to the external power supply to supply power to the press-fit control subsystem 3.

The control center 4 is used to interact with the factory IVIES system for operational tasks, control the work of the subsystems, and upload fault alarm information to the factory MES system. The hardware of the control center is a PLC (Programmable Logic Controller), and the control center communicates with the loading and unloading control subsystem, the visual inspection subsystem, and press-fit control subsystem via communication interfaces under Ethernet/IP protocol.

Figure 5:
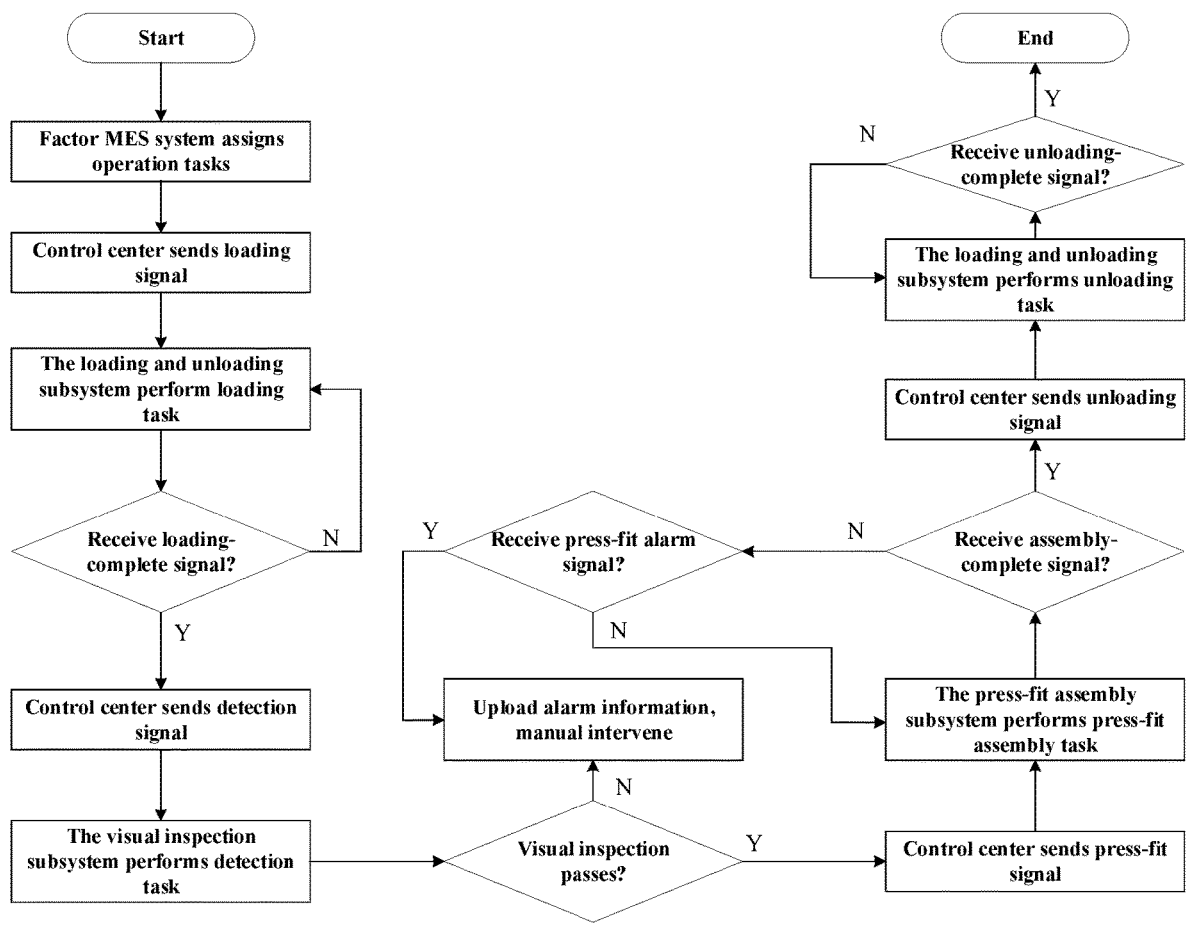
FIG. 5 is the overall flow chart of the automatic press-fit control method proposed in the present invention.

In the process of press-fit assembly of shaft-hole fitting parts, the control center 4 controls the loading and unloading control subsystem 1, the visual inspection subsystem 2, and the press-fitting control subsystem 3 to realize the automation of loading, the automation of hole detection and the automation of press-fit assembly, respectively, as shown in FIG. 5, and the overall control method of automatic press-fit assembly is as follows:

Step 1: The factory MES system sends job assignments to the control center 4, which subsequently sends the loading signal to the loading and unloading control subsystem 1.

Step 2: The loading and unloading control subsystem 1 performs the loading task and sends the loading completion signal to the control center 4 after the loading is completed.

Step 3: The control center 4 sends the detection signal to the visual inspection subsystem 2 after it receives the loading completion signal from the loading and unloading control subsystem.

Step 4: The visual inspection subsystem 2 starts the inspection process to realize visual inspection after receiving the detection signal. If the visual inspection does not pass, the visual inspection subsystem 2 sends alarm information to the control center 4, which uploads the alarm information to the factory IVIES system and waits for manual intervention; if the visual inspection passes, the visual inspection subsystem 2 sends a visual inspection pass signal to the control center 4, which sends a press-fit signal to the press-fit control subsystem 3.

Step 5: The press-fit control subsystem 3 starts to perform the press-fit task to realize the automatic press-fit assembly of the workpiece after receiving the press-fit signal and sends the press-fit completion signal to the control center 4 after the press-fit assembly is completed.

If a fault occurs during the execution of the above press-fit task, the press-fit control subsystem 3 will send a press-fit alarm signal to the control center 4, which will upload the press-fit alarm signal to the factory MES system and wait for manual intervention.

Step 6: The control center 4 sends the unloading signal to the loading and unloading control subsystem 1 after receiving the press-fit completion signal, and the subsystem executes the unloading task to realize automatic unloading.

Step 7: The loading and unloading control subsystem 1 sends the unloading completion signal to the control center 4 after the completion of the unloading task, completing the press-fit assembly of a product.

Figure 6:
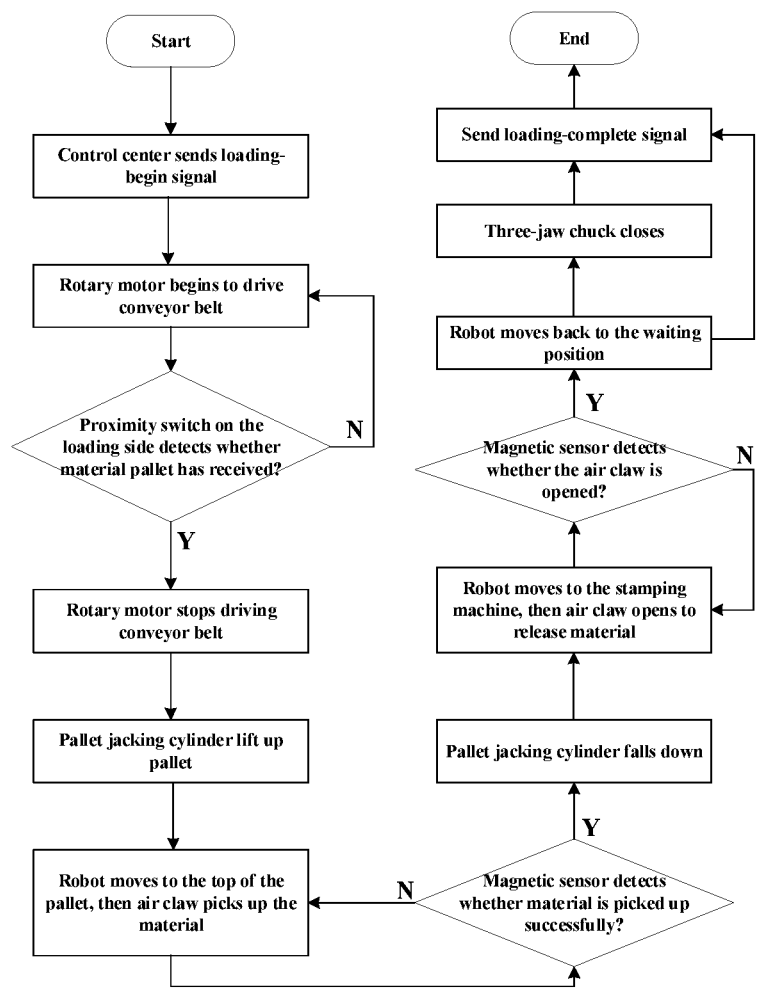
FIG. 6 is the flow chart of the loading control method of the automatic press-fit control system proposed in the present invention.

As shown in FIG. 6, in the step 2 above, the automatic loading control method of the loading and unloading control subsystem 1 is demonstrated as follows:

Step a: The subsystem controls the rotary motor driver 101 to drive the conveyor belt rotary motor 110, and thus drive the conveyor belt. The material pallet moves with the conveyor belt, and the proximity switch 111 on the loading side detects whether the material pallet reached the specified position.

Step b: When the material pallet is detected by the proximity switch 111 on the loading side, the rotary motor driver 101 stops driving the conveyor belt rotary motor 110, and the solenoid valve in the valve island 104 controlling the pallet jacking cylinder 112 is turned on, controlling the pallet jacking cylinder 112 to jack the material pallet.

Step c: The robot control cabinet 103 sends motion commands to the industrial robot 106, controlling the industrial robot 106 to move to the top of the material pallet, then the end air claw 107 of the industrial robot 106 is controlled to close to pick up the workpiece, and the magnetic sensor 108 of the air claw is controlled to detect whether the picking is successful.

Step d: After the workpiece is successfully picked up, the solenoid valve in the valve island 104 controlling the pallet jacking cylinder 112 is disconnected, and the pallet jacking cylinder 112 falls down at this time.

Step e: The robot control cabinet 103 sends motion commands to the industrial robot 106, controlling the industrial robot 106 to move to the press loading position, and at the same time controlling the robot to release the air jaw 107 to place the workpiece on the turntable, and the magnetic sensor 108 detects whether the air jaw 107 is released.

Step f: After the air jaw 107 is released, the robot control cabinet 103 sends motion command to the industrial robot 106, making it move away from the loading position to the waiting position.

Step g: The solenoid valve in the valve island 104 controlling the three-jaw chuck 109 is turned on, forcing the three-jaw chuck 109 to close to clamp the workpiece.

Step h: The loading and unloading control subsystem 1 sends a loading-completion signal to the control center 4, and the loading process is finished.

Figure 7:
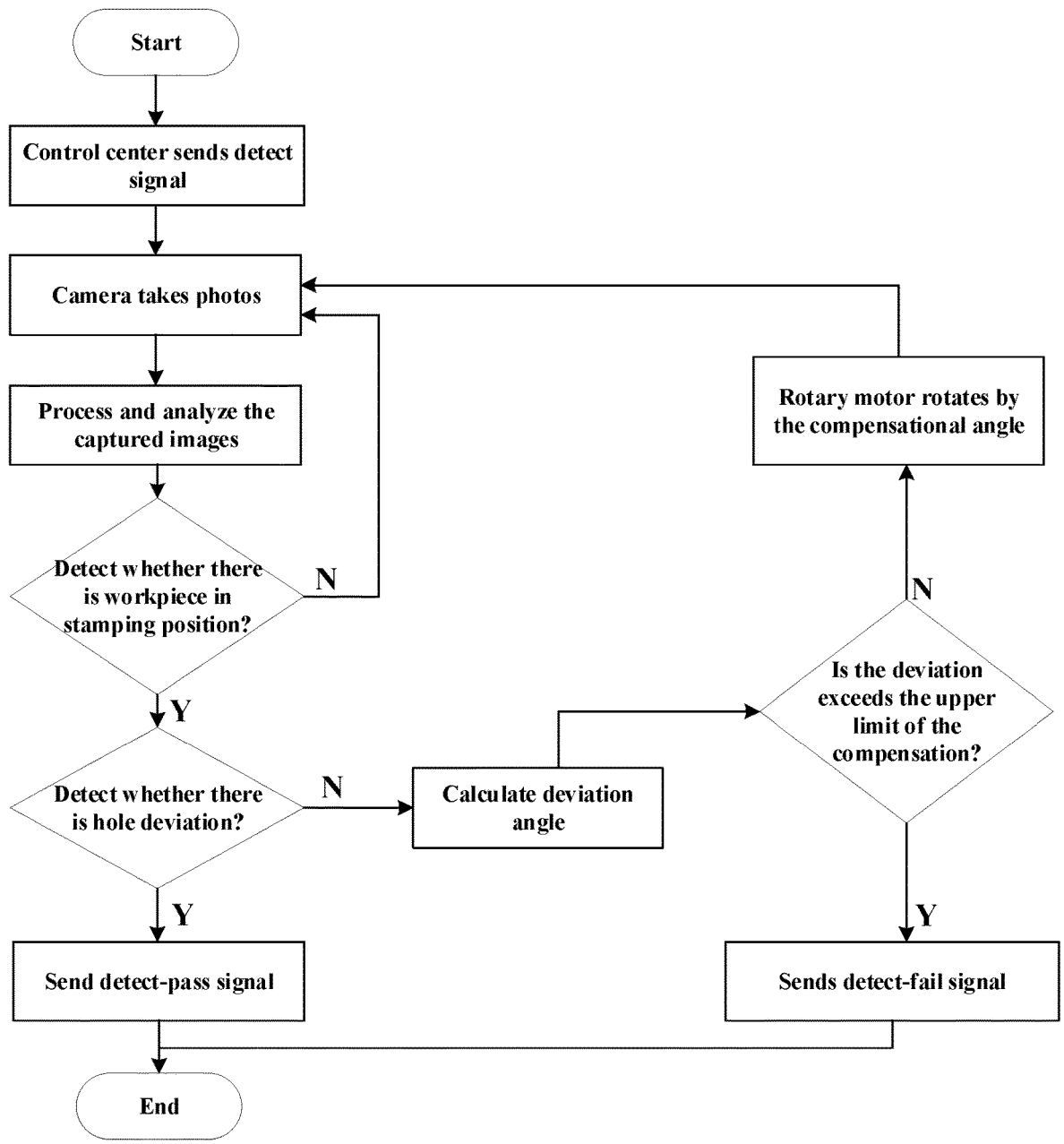
FIG. 7 is the flow chart of the visual inspection control method of the automatic press-fit control system proposed in the present invention.

As shown in FIG. 7, in step 4 above, the control method of the visual inspection system 2 is described as follows:

Step A: The camera controller 202 drags industrial camera 209 to take pictures of workpiece 208 under control, and the image processing system 201 processes and analyzes the obtained images, extracting the position information of the axle hole in the images through edge detection. The position and shape of the extracted axle hole are compared with the calibrated axle hole in order to determine whether the hole position has deviation. If the hole position has no deviation, step B is executed. If the deviation angle of the hole position is within the adjustment range, step D is executed.

Step B: The visual inspection subsystem 2 sends the detect-pass signal to the control center 4, and the visual inspection process is completed.

Step C: The visual inspection system 2 sends the deviation angle to the turntable motor driver 203, and the turntable motor driver 2017 is driven to rotate by one compensating deviation angle, then step A is repeated.

Step D: The image processing system 201 calculates the hole deviation angle. If the hole deviation exceeds the set upper limit of deviation compensation, the visual inspection system 2 sends detect-fail signal to the control center 4, and the visual inspection process is completed.

Figure 8:
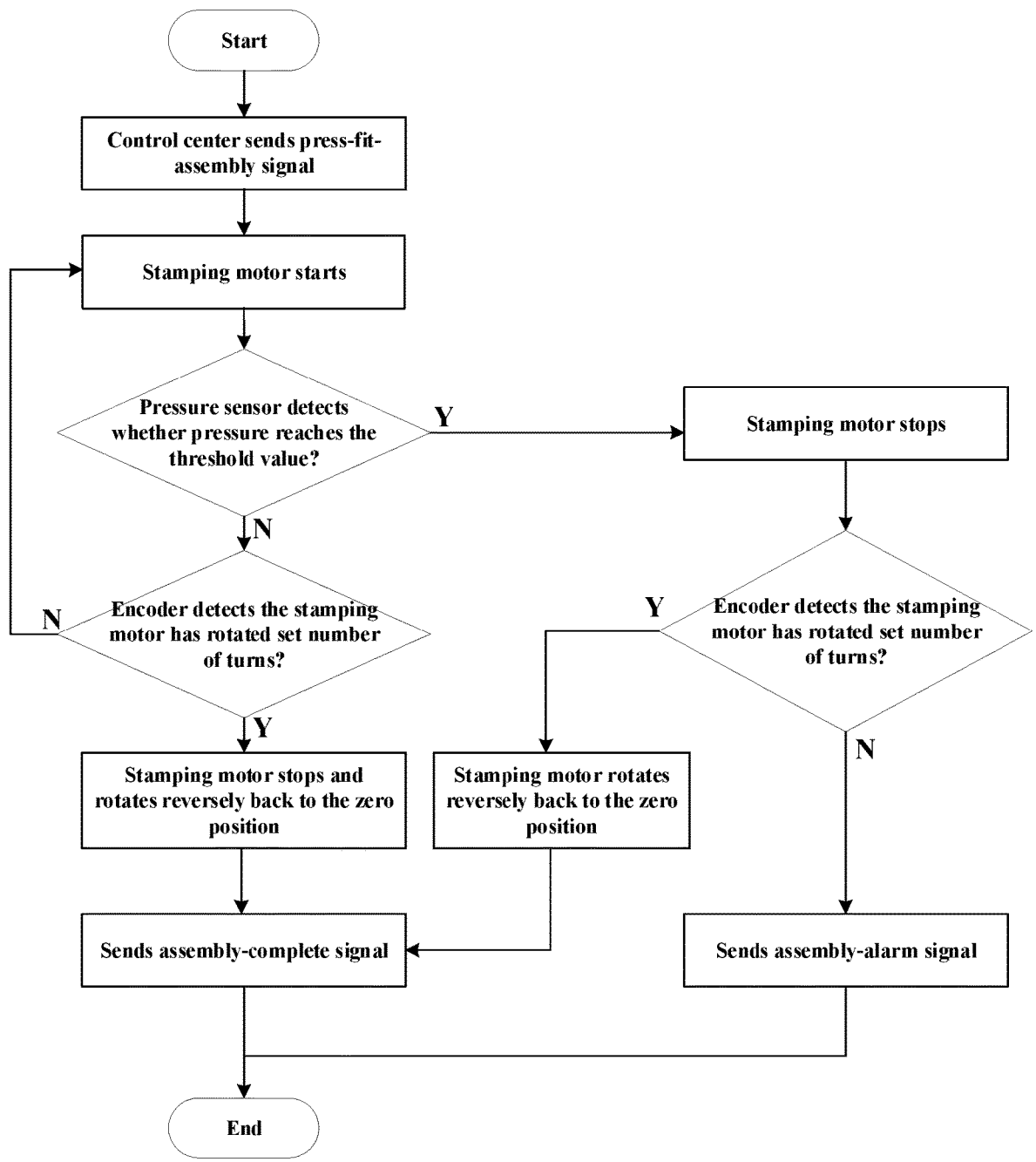
FIG. 8 is the flow chart of the press-fit control method of the automatic press-fit control system of the present invention.

As shown in FIG. 8, in step 5 above, the automatic press-fit control method of press-fit control subsystem 3 is described as follows:

Step 1): The stamping motor driver 302 is controlled to drive the stamping motor 305 to rotate, during which the pressure sensor 304 detects in real-time whether the pressure reaches the threshold value. If the pressure does not reach the threshold value and the turn number of stamping motor 305 recorded by the stamping motor encoder 304 does not reach the set number, step 2) is executed. If the pressure does not reach the threshold value and the turn number of stamping motor 305 recorded by the stamping motor encoder 304 reaches the set number, step 4) is executed.

Step 2): The stamping motor 305 remains rotated under the control of the stamping motor driver 302. If the pressure reaches the threshold value, step 4) is performed.

Step 3): The stamping motor 305 is first stopped and then rotates reversely back to zero position, after which the press-fit control subsystem 3 sends a completion signal to the control center 4 and the press-fit assembly process ends.

Step 4): The stamping motor 305 stops immediately, and the stamping motor encoder 306 detects whether the stamping motor 305 has finished enough turns. If the stamping motor 305 has turned enough turns, the stamping motor 305 rotates reversely to zero position and the press-fit subsystem 3 sends a completion signal to the control center 4 and the press-fit assembly process is finished. If the stamping motor 305 has not turned enough turns, the press-fit control subsystem 3 sends an alarm signal to the control center 4, and the press-fit assembly process is finished.

Figure 9:
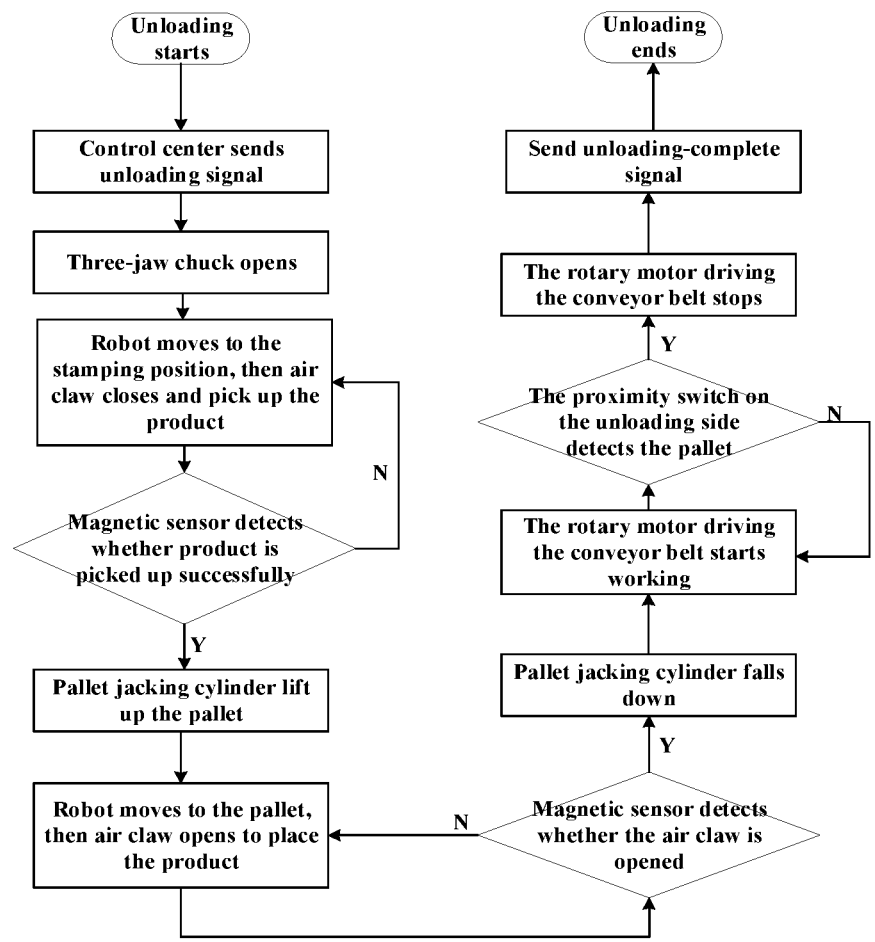
FIG. 9 is the flow chart of the lowering control method of the automatic press-fit control system of the present invention.

As shown in FIG. 9, in step 6 above, the automatic unloading method of the loading and unloading control subsystem 1 is described as follows:

Step ①: Turn on the solenoid valve, which controls the three-jaw chuck, in valve island 104, making the three-jaw chuck 109 open to release the workpiece.

Step ②: The robot control cabinet 103 send the movement command to the industrial robot 106, making the robot 106 move to the loading position, and the end air claw 107 of the robot 106 closes to pick up the workpiece.

Step ③: The magnetic sensor 108 detects whether the product is picked up successfully. After the product is picked up successfully, the solenoid valve controlling the pallet jacking cylinder 112 is turned on to lift up the material pallet.

Step ④: The robot control cabinet 103 sends the movement command to the robot 106, making the robot 106 moves to the top of the material pallet, and the air jaw 107 is released to place the material.

Step ⑤: The magnetic sensor 108 detects whether the air claw 107 is opened. After the air claw 107 is opened, the solenoid valve controlling the pallet jacking cylinder 112 is disconnected and the pallet jacking cylinder 112 falls.

Step ⑥: The rotary motor driver 101 drives the rotary motor 110, and the proximity switch 113 on the unloading side detects whether the pallet reaches the outlet of this station.

Step ⑦: The rotary motor 110 stops when the material pallet is detected by the proximity switch 113 on the unloading side.

Step ⑧: The loading and unloading control subsystem 1 sends a completion signal to the control center 4, then the loading process is finished.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. An automatic press-fit control method for shaft-hole fitting parts adapted for an automatic press-fit control system, comprising:

step 0: providing the automatic press-fit control system, comprising a plurality of subsystems and a control center, wherein the subsystems comprise:

a loading and unloading control subsystem, configured to control a material conveyor, to detect a material pallet in place, and to control the material pallet lifting and an industrial robot;

a visual inspection subsystem, configured to control rotation of a turntable, and to obtain a hole deviation size and a hole deviation angle of a perimeter hole of each of the parts; and a press-fit control subsystem, configured to control a stamping motor, to record a rotation number of the stamping motor to obtain a moving distance of a stamping head, and to detect a pressure change on the stamping head during a press-fit assembly process of the parts;

wherein each of the subsystems has respective communication ports to communicate with the control center therethrough;

wherein the control center is configured to interact with a factory IVIES system for operational tasks, to control operation of the subsystems, and to upload fault alarm information to the factory IVIES system;

step 1: sending, by the factory MES system, job assignments to the control center, and subsequently sending, by the control center, loading signals to the loading and unloading control subsystem;

step 2: performing, by the loading and unloading control subsystem, a loading task, wherein the loading and unloading control subsystem sends a loading completion signal to the control center after the loading task is completed;

step 3: sending, by the control center, a detection signal to the visual inspection subsystem after the control center receives the loading completion signal from the loading and unloading control subsystem;

step 4: starting, by the visual inspection subsystem, an inspection process to realize visual inspection after receiving the detection signal, wherein if the visual inspection does not pass, the visual inspection subsystem sends alarm information to the control center, and the control center uploads the alarm information to the factory MES system and waits for manual intervention; and if the visual inspection passes, the visual inspection subsystem sends a visual inspection pass signal to the control center, and the control center sends a press-fit signal to the press-fit control subsystem;

step 5: performing, by the press-fit control subsystem, a press-fit task to realize automatic press-fit assembly of a workpiece after receiving the press-fit signal, wherein the press-fit control subsystem sends a press-fit completion signal to the control center after the automatic press-fit assembly is completed, and wherein if a fault occurs during the press-fit task, the press-fit control subsystem sends a press-fit alarm signal to the control center, and the control center uploads the press-fit alarm signal to the factory IVIES system and waits for manual intervention;

step 6: sending, by the control center, an unloading signal to the loading and unloading control subsystem after receiving the press-fit completion signal, wherein the loading and unloading control subsystem performs an unloading task in response to the unloading signal to realize automatic unloading; and step 7: sending, by the loading and unloading control subsystem, an unloading completion signal to the control center after completion of the unloading task, thus completing the press-fit assembly of a product.

2. The automatic press-fit control method according to claim 1, wherein in the step 2, the loading task performed by the loading and unloading control subsystem comprises:

step a: controlling, by the loading and unloading control subsystem, a rotary motor driver to drive a rotary motor of the material conveyor, and thus driving the material conveyor, wherein the material pallet moves with the material conveyor, and a loading side proximity switch detects whether the material pallet reaches a specified position;

step b: when the material pallet is detected by the loading side proximity switch, stopping, by the rotary motor driver, driving the rotary motor, and turning on a solenoid valve controlling a pallet lifting cylinder to control the pallet lifting cylinder to lift the material pallet;

step c: sending, by the control center, motion commands to the industrial robot to control the industrial robot to move to be above the material pallet, then to control end air claws of the industrial robot to close to pick up the workpiece, and to control an air claw magnetic sensor to detect whether the picking is successful;

step d: after detecting that the workpiece is successfully picked up, disconnecting the solenoid valve controlling the pallet lifting cylinder, wherein the pallet lifting cylinder falls down at this time;

step e: sending the motion commands to the industrial robot to control the industrial robot to move to a press loading position, and at the same time to control the industrial robot to release end air jaws to place the workpiece on the turntable, and detecting whether the air jaws are released by the air jaw magnetic sensor;

step f: after the air jaws are released, the motion command is given to the industrial robot to control the movement of the industrial robot away from the press loading position to a waiting position;

step g: turning on a solenoid valve controlling a three-jaw chuck to control the three-jaw chuck to clamp the workpiece; and step h: sending, by the loading and unloading control subsystem, a loading-completion signal to the control center to complete the loading task.

3. The automatic press-fit control method according to claim 1, wherein in the step 4, the inspection process comprises:

step A: controlling an industrial camera to take photographs of the workpiece, and controlling an image processing system to process and analyze images of the photographs, to extract positions of axial holes from the images through edge detection, and to compare the extracted positions and shapes of the axial holes with positions and shapes of calibrated circular holes in order to determine whether the positions of the axial holes are deviated, wherein step B is executed if the positions are deviated, and step D is executed if a hole deviation angle is within an adjustment range;

step B: sending, by the visual inspection subsystem, a detect-pass signal to the control center, thus completing the inspection process;

step C: sending, by the visual inspection system, the hole deviation angle to a turntable motor driver, wherein the turntable motor driver is driven to rotate by one compensating deviation angle, and repeating the step A; and step D: calculating, by the image processing system, the hole deviation angle, and sending, by the visual inspection system, a detect-fail signal to the control center if the hole deviation angle exceeds a preset upper limit of deviation compensation, thus completing the inspection process.

4. The automatic press-fit control method according to claim 1, wherein in step 5, the press-fit task comprises:

step 1): controlling the stamping motor to rotate, and detecting, by a pressure sensor in real time, whether a pressure reaches a threshold value, wherein step 2) is executed if the pressure does not reach the threshold value and the stamping motor does not reach a preset number of turns, and step 4) is executed if the pressure does not reach the threshold value and the stamping motor reaches the preset number of turns;

step 2): controlling the stamping motor to remain rotating, wherein the step 4) is executed if the pressure reaches the threshold value;

step 3): controlling the stamping motor to stop and rotate reversely to zero position, and sending, by the press-fit control subsystem, the press-fit completion signal to the control center to complete the press-fit task; and step 4): stopping the stamping motor immediately and detecting whether the stamping motor reaches the preset number of turns, wherein if the stamping motor reaches the preset number of turns, the stamping motor rotates reversely to the zero position and the press-fit control subsystem sends the press-fit completion signal to the control center to complete the press-fit task, and if the stamping motor does not reach the preset number of turns, the press-fit control subsystem sends the press-fit alarm signal to the control center to complete the press-fit task.

5. The automatic press-fit control method according to claim 1, wherein in the step 6, the unloading task comprises:

step ①: turning on a solenoid valve controlling a three-jaw chuck to control the three-jaw chuck to open to release the workpiece;

step ②: sending a motion command to the industrial robot to control the industrial robot to move to a press loading position, and to control end air claws of the industrial robot to close to pick up the workpiece;

step ③: detecting, by an air claw magnetic sensor, whether a product is picked up successfully, wherein after the product is picked up successfully, the solenoid valve controlling a pallet lifting cylinder is turned on to lift up the material pallet;

step ④: sending, by a robot control cabinet, movement commands to the industrial robot to control the industrial robot to move to be above of the material pallet, and to control the end air jaws of the industrial robot to release to place a material;

step ⑤: detecting, by the air claw magnetic sensor, whether the end air jaws are open, wherein after the end air jaws are open, the solenoid valve controlling the pallet lifting cylinder is disconnected and the pallet lifting cylinder falls;

step ⑥: controlling a rotary motor to drive the material conveyor, and detecting, by an unloading proximity switch, whether the material pallet reaches an outlet;

step ⑦: stopping the rotary motor when the material pallet is detected by the unloading proximity switch; and step ⑧: sending, by the loading and unloading control subsystem, the unloading completion signal to the control center to complete the unloading task.

* * * * *